United States Patent Office 2,711,376
Patented June 21, 1955

2,711,376

PREPARATION AND USE OF SERICEOUS SOLUTIONS

Thomas C. Whitner, Elizabeth, N. J.

No Drawing. Application June 25, 1949,
Serial No. 101,499

14 Claims. (Cl. 117—141)

This invention relates to the preparation of aqueous solutions containing dissolved sericeous material. It also includes the application of such solutions for impregnating textile fibers with sericeous material.

In U. S. Patent 2,417,388, issued March 11, 1947, I have described a method for impregnating cellulose fibers with sericeous materials. The procedure includes dissolving silk fibers in an aqueous solution containing an alkylolamine-copper complex and a small proportion (from about 0.5 to about 4 per cent) of an alkali metal hydroxide. Cellulose fibers are saturated with such a solution, then the saturated fibers are washed with a dilute aqueous solution of an acid forming water-soluble salts with the alkylolamine-copper complex and with the alkali metal hydroxide, afterwards washed with water, and finally dried. I have observed that the solubility of silk fibers is greatly decreased if the aqueous solution of alkylolamine-copper complex and alkali metal hydroxide contains an appreciable proportion of a water-soluble acyclic alcohol. In fact, if the solvent for the alkylolamine-copper complex and alkali metal hydroxide is aqueous alcohol, i. e., a liquid homogeneous mixture of alcohol and water containing not less than about 60 per cent alcohol by volume, then the solution can be employed for treating silk fibers to furnish a dark purple-colored gummy mass which is soluble in water but very much less so, and in some instances substantially insoluble, in the aqueous alcoholic solvent. Moreover, the aqueous solution of this gummy mass can be used for impregnating textile fibers with sericeous material.

To prepare a solution of alkylolamine-copper complex and alkali metal hydroxide suitable for my purpose, I find the following procedure to be a convenient one: Copper hydroxide is admixed with the aqueous alcoholic solvent and to the mixture is added slowly and in small portions a sufficient quantity of alkylolamine to dissolve the copper hydroxide in the aqueous alcohol and thereby furnish a dark-blue colored solution. The rate of solution of copper hydroxide is very much slower, in most instances, than if water alone were employed as the solvent. Consequently, it is advantageous to add the alkylolamine in small portions and to stir occasionally the mixture of copper hydroxide and aqueous alcoholic solution of alkylolamine. After solution of the copper compound is effected, then the alkali metal hydroxide is dissolved in the liquid. The last-mentioned step may be accomplished either by adding the solid alkali metal hydroxide to the solution of copper complex and stirring, or by admixing an aqueous solution of the alkali metal hydroxide with the aqueous alcoholic solution. Should any heat develop during dissolution of the alkali metal hydroxide in the aqueous alcohol, it is desirable to cool the latter in any suitable manner.

As a modification of the above-indicated method, I may use a copper salt (such as crystalline copper chloride) instead of hydroxide. Such a salt should exhibit an appreciable or substantial solubility in the alcohol or in the aqueous alcohol. After the copper salt is dissolved, then the alkylolamine is added slowly to the solution. At first a precipitate of copper hydroxide is formed, but this dissolves and furnishes a blue solution on continued addition of the alkylolamine. As the next step, the requisite quantity of alkali metal hydroxide is dissolved in the aqueous alcoholic solution of alkylolamine-copper complex. Upon dissolution of this hydroxide there may be formed a precipitate of alkali metal salt corresponding to the copper salt which was used. This precipitate of alkali metal salt may be attributed to the reaction between alkali metal hydroxide and alkylolamine salt, the latter being formed in the first step in the reaction between alkylolamine and copper salt. The aqueous alcoholic solution can be separated from the precipitated salt by any convenient procedure, as for example by filtration or by decantation.

Instead of dissolving all of the alkali metal hydroxide in one step in the aqueous alcoholic solution of alkylolamine-copper complex, a portion sufficient to react with the alkylolamine salt may be dissolved. Then, after separation of the precipitated alkali metal salt, e. g., by filtration, sufficient alkali metal hydroxide can be dissolved in the aqueous alcoholic solution to give the desired concentration.

After preparing an aqueous alcoholic solution of alkylolamine-copper complex and alkali metal hydroxide by any of the above-indicated methods (or by their equivalents), I admix silk fibers with the solution and allow the admixture to stand until the fibers become a dark purple colored mass. The quantity of fibers employed in this step may be sufficient to soak up all of the aqueous alcoholic solution, or the quantity may be less than this amount and some supernatant liquid be present. During this treatment it is well to stir or agitate the mixture occasionally so as to obtain intimate contact between fibers and liquid. Afterwards, the supernatant liquid (if any) is withdrawn and the treated fibers are pressed to eliminate as much as possible of the alcoholic liquid which is held by them. As the next step, the treated fibers are washed one or more times with portions of the aqueous alcohol, and the fibers are pressed after each washing to aid in removing the liquid from the fibers.

The treated and washed dark colored mass obtained in this manner then is extracted with water. Extraction can be effected in any convenient manner, as for example, admixing the mass with water, allowing the mixture to stand for a suitable length of time, and then filtering to separate the aqueous liquid from any undissolved material. The clear, purple-colored, aqueous liquid obtained as the filtrate, since it contains dissolved sericeous material, can be employed for impregnating textile fibers with sericeous material.

To effect such impregnation, the textile fibers are saturated (in any suitable or convenient manner) with this aqueous solution. Afterwards, the liquid-saturated fibers are washed with dilute aqueous acid, then with water, and finally are dried. Or, the saturated fibers may be dried (e. g., by exposure to the atmosphere), then washed successively with dilute aqueous acid and water, and dried. As the aqueous solution of sericeous material contains copper compounds, and may contain a very small proportion of alkali metal hydroxide, in washing the saturated fibers it is necessary to use an aqueous solution of an acid which forms water-soluble salts with the copper compounds and with the alkali metal hydroxide. Examples of suitable acidic substances are hydrochloric acid, sulfuric acid and acetic acid. Although most of the copper and alkali metal salts will be eliminated from the fibers during the acid wash, nevertheless the fibers should be washed afterwards with water so as to obtain substantially complete elimination of all salts and acid.

The following examples will illustrate my invention.

*Example 1.*—A solution of copper complex in isopropyl alcohol was prepared in the following manner and by using the following proportions of materials: 8 parts of isopropyl alcohol (99 per cent) were admixed with 4 parts of water. To the resulting homogeneous liquid was added 0.24 part of solid sodium hydroxide. As the latter dissolved, the liquid separated into two layers. After solution of the alkali was complete, 5 parts of diethanolamine were added to the liquid mixture and, on stirring, a homogeneous alcoholic solution of the alkylolamine and alkali metal hydroxide was obtained. Next, 0.1 part of copper hydroxide was added, and the mixture of solution and solid hydroxide was allowed to stand (with occasional stirring) until all of the copper compound dissolved and the solution was deep blue in color.

Silk fibers were admixed with the alkaline solution of diethanolamine-copper complex and worked therein until they became dark purple or almost black in color. Afterwards, the fibers were separated from the solution and washed with some of the aqueous isopropyl alcohol which was employed as a solvent. Next, the treated fibers were admixed with a sufficient volume of water so that, on stirring, nearly all of them dissolved in the aqueous liquid. The latter was filtered to eliminate a small quantity of undissolved material.

Unbleached cotton cloth was saturated with some of this aqueous solution and then dried by exposure to the atmosphere. The cloth then was washed successively with dilute aqueous hydrochloric acid and water and again dried. This sample of fabric had a smoother and fuller feel than the untreated fabric.

*Example 2.*—A solution of alkylolamine-copper complex was prepared by admixing the following substances in the proportions indicated: 10 parts of aqueous ethyl alcohol (70 per cent), 3 parts of triethanolamine and 0.2 part of copper hydroxide. After the copper compound had dissolved, 0.3 part of sodium hydroxide was dissolved in the dark blue alcoholic solution. The dark blue liquid then was admixed with silk fibers and the mixture allowed to stand at room temperature for 40 minutes, stirring the mixture occasionally. The fibers became very dark in color and almost sticky or gummy. The alcoholic liquid was separated from the fibers, the latter were washed twice with 70 per cent ethyl alcohol, with pressing of the fibers after each wash to eliminate as much alcoholic liquid as possible, and then the washed fibers were admixed with about 30 times their weight of water, and this step resulted in solution of a large proportion of the treated and washed silk. The aqueous liquid was separated from undissolved material by filtration.

Bleached cotton cloth was saturated with this aqueous solution, then allowed to drain and to dry while exposed to the atmosphere, and afterwards the fabric was washed successively with dilute aqueous sulfuric acid and water, and dried. This fabric again was impregnated with the aqueous solution of sericeous material, then washed successively with dilute aqueous acid and water, and dried.

A portion of the treated bleached cotton cloth and one of the untreated bleach fabric were dyed separately. In each instance, 100 parts of water and 5 per cent (on weight of sample) of a red acid dye were used. The dye baths were warmed to 40° C., the samples entered, and the baths kept at a temperature of 40° to 45° C. for a period of 2 hours. The baths then were allowed to cool to room temperature, the samples removed and rinsed well with cold water, and dried. The untreated fabric was a light pink in color while the treated cloth was a full red in color.

*Example 3.*—One part of copper chloride

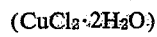

(CuCl$_2$·2H$_2$O)

was dissolved in 15 parts of 70 per cent aqueous ethyl alcohol and to the solution was added 2-methyl-2-aminopropanediol-1,3 until a blue colored liquid was obtained and all the copper compounds were dissolved. Next, sufficient potassium hydroxide was dissolved in the blue-colored liquid to effect substantially complete precipitation of the chlorine as potassium chloride. The latter was separated from the solution of alkylolamine-copper complex by filtration. Afterwards, there was dissolved in the filtrate sufficient potassium hydroxide to furnish substantially a 2 per cent solution of the alkali metal hydroxide.

To the resulting solution, which contained both copper complex and alkali metal hydroxide, were added silk fibers, and these were permitted to remain in contact with the solution at room temperature for 1 hour. Afterwards, the alcoholic liquid was separated as well as possible from the treated mass of fibers, the latter were washed with two successive portions of the 70 per cent aqueous alcohol with separation of the wash liquid each time as well as possible, and then the mass of fibers was admixed with 30 times its weight of water and the admixture allowed to remain overnight at room temperature. The aqueous liquid next was separated from undissolved material by filtration. Titration of the filtrate (with standardized aqueous acid) indicated its total alkaline content was 0.08 per cent (calculated as potassium hydroxide).

Unbleached cotton cloth was saturated with some of this aqueous solution of sericeous material and then dried at room temperature. Afterwards, the fabric was washed successively with dilute aqueous sulfuric acid and water, and dried. This treated cloth possessed a smoother and fuller feel than the original untreated fabric.

A portion of this treated cloth and one of the untreated fabric were dyed separately, using in each instance 70 parts of water per 1 part of sample and 5 per cent (on weight of cloth) of a red acid dye. The samples were placed in the respective baths at room temperature, the temperature of the baths then increased to 40° C. and kept at 40° to 45° C. for 1 hour. The baths then were permitted to cool to room temperature, the samples removed and rinsed well with tap water, and dried. The untreated cloth was a very light pink in color while the treated sample was a light red.

*Example 4.*—To 90 cc. of 70 per cent aqueous ethyl alcohol was added 1 g. of copper hydroxide and to the mixture was added ethanolamine slowly until the copper compound was dissolved. The resulting blue solution was diluted with the alcohol until the total volume was 100 cc. Sufficient solid sodium hydroxide was dissolved in the solution to give substantially 1 per cent concentration of this alkali. All of this solution was admixed with silk fibers and the mixture allowed to stand at room temperature (with occasional stirring) until the fibers had changed in appearance to a dark-colored gummy mass. The latter then was separated from the alcoholic solution as well as possible by pressing, and afterwards washed well with two successive portions of 70 per cent aqueous alcohol. The treated and washed fibers (after being freed as much as possible from the aqueous ethyl alcohol by pressing) were admixed with 100 cc. of water and the mixture allowed to stand for three days at room temperature. Next, the aqueous liquid and undissolved material were separated by filtration. In this instance, the filtrate or aqueous solution of sericeous material had a total alkaline content (as estimated by titration of a portion of it with standardized aqueous acid) of 0.46 per cent, calculated as sodium hydroxide.

Unbleached cotton yarn was saturated with this aqueous solution by immersion in some of it for 20 minutes at room temperature. Afterwards, the yarn was allowed to drain and then was washed successively with dilute aqueous sulfuric acid and water, and dried at 70° to 75°

C. This sample of treated yarn and one of the untreated yarn were dyed separately by immersion overnight (about 16 hours) in an aqueous solution consisting of 100 parts of water per 1 part of yarn and 10 per cent (on weight of yarn) of a blue substantive dye. Next, the samples were removed from the respective baths, rinsed with cold water, and dried. The treated sample of yarn was dyed to a darker color than the untreated one.

*Example 5.*—A solution consisting of 50 cc. of isopropyl alcohol (99 per cent) and 10 cc. of water was admixed with 0.7 g. of copper hydroxide. To this mixture triethanolamine was added slowly until all of the copper compound dissolved. The blue solution then was diluted to a volume of 96 cc. with the isopropyl alcohol and afterwards admixed with an aqueous solution consisting of 2 g. of potassium hydroxide in 4 cc. of water. These steps furnished a dark blue aqueous alcoholic solution of alkylolamine-copper complex and alkali metal hydroxide.

A sufficient volume of this solution was admixed with 8 g. of silk fibers so that the fibers were thoroughly moistened but there was no excess liquid. After approximately 45 minutes, the wet fibers were pressed and the aqueous alcoholic liquid separating thereupon was substantially colorless but strongly alkaline. After eliminating as much alcohol as possible from the fibers, the latter were moistened again with some of the aqueous alcoholic copper solution and allowed to stand at room temperature until substantially colorless but strongly alkaline aqueous alcoholic liquid was separated therefrom on pressing. This series of operations was repeated until all of the blue-colored alcoholic solution had been used in treating the silk fibers. The latter, which had become a very dark colored mass, were washed twice with 86 per cent aqueous isopropyl alcohol, using 50 cc. each time and also pressing the mass of fibers to eliminate as much aqueous alcoholic wash liquid as possible. The mass of fibers then was admixed with 150 cc. of water and, after the mixture had stood for about 30 minutes, the aqueous solution was separated from undissolved material by filtration. In this instance it was estimated (by titration of a portion of the aqueous solution with standard aqueous acid) that the alkalinity of the aqueous extract was 0.25 per cent, calculated as potassium hydroxide.

Bleached cotton yarn was impregnated with some of the aqueous extract by immersion therein for 30 minutes at room temperature. The yarn was dried by exposure to the atmosphere. The dried yarn was washed with dilute aqueous sulfuric acid and then with water and dried at a temperature of 70° to 75° C.

This treated sample and also one of the untreated yarn were dyed separately, using in each instance a bath consisting of 100 parts of water per 1 part of yarn and 6 per cent (on weight of sample) of a basic red dye. The samples were immersed in the respective baths at room temperature, then the temperature of the baths was increased to 60° C. over a period of one-half hour and kept at 60° to 65° C. for thirty minutes. Afterwards, the baths were allowed to cool to room temperature, the samples were removed and rinsed with cold water, and dried. The treated yarn dyed to a darker color than the untreated sample.

*Example 6.*—Triethanolamine was added slowly to a mixture of 30 cc. of water and 1 g. of copper hydroxide until all of the copper compound dissolved. The volume of the solution increased to 40 cc. Then 100 cc. of substantially anhydrous tertiary butyl alcohol were admixed with the blue aqueous solution of alkylolamine-copper complex and the mixture was stirred until a homogeneous liquid was obtained. In this liquid was dissolved sufficient potassium hydroxide to give substantially a 1 per cent solution of the alkali metal hydroxide.

The aqueous alcoholic solution was admixed with silk fibers (3.5 g.) and the mixture permitted to stand at room temperature for 3.5 hours. The supernatant liquid was poured off and as much liquid expelled from the fibers as possible. The latter than were washed well with several portions of aqueous ter.-butyl alcohol (made by mixing alcohol and water in the proportion by volume of 100 of the former to 40 of the latter). After expelling as much as possible of the aqueous alcohol from the fibers, the latter were admixed with 100 cc. of water. Most of the treated fibers dissolved in the aqueous liquid and it was separated from any undissolved material by filtration. Titration of a portion of the filtered aqueous solution with standard aqueous acid indicated its total alkalinity was 0.38 per cent, calculated as potassium hydroxide.

Unbleached cotton yarn was saturated with some of the aqueous solution of sericeous material by immersion therein for 20 minutes at room temperature. Afterwards, the yarn was removed from the solution, allowed to drain, and then washed successively with dilute aqueous acid and with water, and dried at 65 to 70° C. This treated yarn and also a sample of the untreated yarn were dyed separately. In each case a dye bath was used which consisted of 80 parts of water per 1 part of yarn and 8 percent (on weight of sample) of a green substantive dye. The samples were immersed in the respective baths for 5 hours at room temperature, then removed, rinsed well with water and dried. The treated yarn was darker in color than the untreated sample and also possessed a smooth feel such as that usually associated with silk.

*Example 7.*—To a mixture of 10 cc. of water and 50 cc. of isopropyl alcohol (99 percent) were added 1.5 g. of copper hydroxide. To this mixture isopropanolamine was added slowly until the copper compound dissolved with the formation of a dark blue colored solution. Sufficient sodium hydroxide then was dissolved in the solution to give substantially 2 percent of the alkali metal hydroxide.

With this solution were admixed 3 g. of silk cloth (cut into small pieces) and the mixture allowed to stand (with occasional shaking) at room temperature for 4 hours. Afterwards, the aqueous alcoholic solution was decanted and the dark colored residue was washed with 99 percent isopropyl alcohol and then with 80 per cent (by volume) aqueous isopropyl alcohol. After separating as much as possible of the aqueous alcohol, 60 cc. of water were admixed with the residue. Substantially all of the latter dissolved. The aqueous liquid was filtered and only a very small quantity of water-insoluble material was obtained.

Woolen yarn was saturated with some of the aqueous solution of sericeous material by immersion therein at room temperature. Afterwards, the yarn was allowed to drain and then to dry by exposure to the atmosphere. Next, the sample was washed with dilute aqueous sulfuric acid, then several times with water, and afterwards dried.

This treated sample and also one of the untreated material were dyed separately, using in each instance a bath consisting of 80 parts of water per 1 part of yarn and 10 per cent (on weight of yarn) of a blue substantive dye. Samples were immersed in the respective baths at room temperature and permitted to remain therein over night (about 16 hours). Afterwards, each sample was removed from its bath, rinsed well with water and dried. The treated wool was much darker in color and had a smoother feel than the untreated wool.

*Example 8.*—Silk cloth was washed thoroughly with warm aqueous soap solution and then with water until it possessed a very soft feel. A portion of this fabric was impregnated with some of the aqueous solution of sericeous material as prepared in Example 7 by immersion therein at room temperature. Afterwards, the impregnated fabric was allowed to drain and to dry while exposed to the atmosphere. The dried cloth then was washed successively with dilute aqueous sulfuric acid and with water and again dried by exposure to the atmosphere. This treated fabric had a smoother feel and somewhat more body than the untreated cloth and also possessed that property which is described as scroop.

*Example 9.*—To a solution consisting of 2 g. of crystalline copper chloride ($CuCl_2 \cdot 2H_2O$) in 20 cc. of water were added 80 cc. of normal propyl alcohol. Then to the resulting clear homogeneous liquid ethanolamine was added slowly until a clear blue solution of the alkylolamine-copper complex was obtained. In this liquid was dissolved sufficient potassium hydroxide to react with the copper chloride, and afterwards the precipitated potassium chloride was separated by filtration. Next, sufficient potassium hydroxide was dissolved in the filtrate to give substantially 3 per cent of the alkali metal hydroxide in solution.

The solution of alkylolamine-copper complex and alkali metal hydroxide was admixed with approximately 15 g. of silk fibers and the mixture permitted to stand (with occasional shaking) at room temperature for 30 minutes. Afterwards, the substantially colorless aqueous alcoholic liquid was separated from the treated silk fibers and the latter were washed four successive times with 80 per cent aqueous n-propyl alcohol (using 100 cc. of the alcoholic liquid each time).

After separating the alcoholic liquid as well as possible from the treated fibers each time by filtration, the fibers then were admixed with 100 cc. of water and the mixture allowed to stand for 1 hour at room temperature. The aqueous liquid was separated by filtration from the fibers and the latter extracted a second time in the same manner with another 100 cc. portion of water.

Bleached cotton cloth was saturated with some of the second aqueous extract, and then was allowed to drain and to dry by exposure to the atmosphere. Next, the substantially dry impregnated fabric was washed with dilute aqueous sulfuric acid containing 5 per cent of dissolved sodium sulfate, and afterwards washed with water, and air-dried.

This treated fabric and also a portion of the original untreated fabric were dyed separately. In each instance the dye bath consisted of 100 parts of water per 1 part of cloth and 10 per cent (on weight of sample) of a substantive dye (Primuline). The samples were allowed to remain in their respective baths overnight at room temperature, then were removed, rinsed well with water and dried. The treated cloth was darker in color than the untreated fabric and also possessed a smoother feel.

*Example 10.*—Diethanolamine was added slowly and with stirring to a mixture consisting of 2 g. of copper hydroxide and 20 cc. of water until all the copper compound dissolved and a clear blue solution was obtained. This liquid then was diluted with 80 cc. of normal propyl alcohol. Afterwards, sufficient potassium hydroxide was dissolved in the aqueous alcoholic solution to give substantially 4 per cent of the alkali metal hydroxide. Titration of a portion of this solution with standard aqueous sulfuric acid indicated its total alkalinity to be equivalent to 11.08 g. of potassium hydroxide per 100 cc.

Eight grams of silk fibers were admixed with 80 cc. of this aqueous alcoholic solution and the mixture allowed to stand (with occasional stirring) at room temperature for 30 minutes. The alcoholic liquid, which had only a tinge of blue color, was separated as completely as possible and the dark colored residue (of treated silk fibers) was washed 4 successive times with 80 per cent aqueous n-propyl alcohol. In each instance, the volume of alcoholic liquid was 80 cc., the treated fibers were worked therein for 10 minutes at room temperature, and the liquid was separated from the insoluble mass by filtration.

After the treated fibers were washed with aqueous alcohol they were extracted twice with water. Each time a volume of 80 cc. of water was employed, the fibers remained in contact with the aqueous liquid for 10 minutes at room temperature, and then the aqueous liquid was separated by filtration. The total alkalinity of the first aqueous extract was ascertained to be equivalent to 1.91 g. of potassium hydroxide per 100 cc. and that of the second extract to be equivalent to 0.76 g. of potassium hydroxide per 100 cc.

*Example 11.*—Unbleached cotton cloth was saturated with the first aqueous extract of Example 10 by immersion therein at room temperature. Afterwards, the impregnated cloth was dried by exposure to the atmosphere. When dry, it was washed with dilute aqueous sulfuric acid containing 5 per cent of sodium chloride. Next, it was washed with water and dried.

This sample of treated cloth and one of the untreated original fabric were dyed separately. In each instance a dye bath consisting of 100 parts of water per 1 part of cloth and 5 per cent (on weight of sample) of an acid dye (Fast Red SS Extra) was used. The samples were kept immersed in the respective baths for 3 hours at room temperature, then removed, rinsed well with water and dried. The untreated fabric was a light pink in color while the treated cloth was a good full red in color. Also, the latter cloth possessed a smoother feel and more body.

*Example 12.*—Unbleached cotton cloth was saturated with the second aqueous extract of Example 10 by immersion therein at room temperature. Afterwards, the impregnated cloth was dried by exposure to the atmosphere. When dry, it was washed with dilute aqueous sulfuric acid containing 10 per cent of magnesium sulfate ($MgSO_4 \cdot 7H_2O$). Next, it was washed with water and dried.

This sample of treated cloth and one of the untreated original fabric were dyed separately. In each instance a dye bath consisting of 100 parts of water per 1 part of cloth and 5 per cent (on weight of sample) of a basic dye (Safranine Y Ex. Conc.) was used. The samples were allowed to remain immersed in the respective baths overnight at room temperature, then removed, rinsed well with water, and dried. In this case, the two samples were not dyed to shade of color, as the untreated fabric was a rusty, brownish red while the treated cloth was a bright, clear red.

Copper hydroxide employed in the above examples was prepared in the following manner: A copper salt, such as copper sulfate ($CuSO_4 \cdot 6H_2O$) or copper chloride ($CuCl_2 \cdot 2H_2O$), was dissolved in water and then about one-fourth its weight of ammonium sulfate or ammonium chloride was dissolved in the solution. An aqueous solution of sodium hydroxide was slowly admixed with the solution of copper salt until substantially all the copper was precipitated as the hydroxide. The latter was washed several times by decantation with water and then filtered and the precipitate was washed (on the filter) with water until it was substantially free of salts. The copper hydroxide then was dried at room temperature.

In Examples 3, 4, 6 and 10 it is shown that the alkalinity of the aqueous extract is always less than the alkalinity of the aqueous alcoholic solution of alkylolamine-copper complex and alkali metal hydroxide used for the treatment of silk fibers. This condition is due to separating the aqueous alcoholic treating liquid from the fibers and washing them with aqueous alcohol before they are extracted with water. Washing with aqueous alcohol effects not only removal of alkali metal hydroxide from the mass of treated silk fibers but also removal of any excess alkylolamine which may have been employed when the copper compound initially was changed into the alkylolamine-copper complex and in addition removal of any alkylolamine-copper complex which may not be in combination with sericeous material. The degree or extent to which the alkaline bodies (alkylolamine, alkali metal hydroxide and any uncombined alkylolamine-copper complex) are eliminated will depend of course upon the number of washings with aqueous alcohol given the treated silk fibers prior to extraction of them with water.

Washing the treated fibers, as mentioned above, and then extracting them with water furnishes an aqueous extract which has a very small proportion, less than 0.5 per cent, of alkali metal hydroxide. If such treated fibers be washed several times with aqueous alcohol prior to extracting with water, then the aqueous extract will contain the alkylolamine (in the form of alkylolamine-copper complex combined with sericeous material) as substantially the only alkali dissolved in the aqueous liquid.

As shown in Example 7, an aqueous extract prepared according to this invention can be used in the treatment of wool fibers. If an aqueous solution of sericeous material prepared as described in U. S. 2,417,388 be substituted therefor, then the wool fibers become gray or black in color and this color is not eliminated on washing the wool fibers with aqueous acid. Discoloring of wool can be effected with an aqueous solution of alkylolamine-copper complex and alkali metal hydroxide in which the proportion of the latter compound falls within the limits disclosed in U. S. 2,417,388. These results seem to indicate that alkali metal hydroxide and alkylolamine-copper complex (either as such or when present with sericeous material) react with wool fibers to give copper sulfide as a reaction product. On the other hand, since the aqueous solutions (or extracts) prepared according to this invention contain such a small proportion of dissolved alkali metal hydroxide, or are substantially devoid thereof, they are applicable not only for the treatment of vegetable fibers (such as cotton and linen) but also for the treatment of animal fibers (such as wool and silk) without reacting with them in an undesirable manner.

From the foregoing disclosures it will be seen that my invention includes a method for preparing an aqueous solution of sericeous material suitable for the treatment of various fibers. This method comprises treating silk fibers with an aqueous alcoholic solution of an alkylolamine-copper complex and an alkali metal hydroxide, then separating the treated silk fibers as well as possible from the alcoholic solution, washing them with the aqueous alcoholic solvent, and afterwards extracting the treated and washed fibers with water.

My invention also includes impregnating textile fibers with the aqueous solution of sericeous material (which is prepared as just indicated) and then washing the impregnated fibers with an aqueous solution of an acidic agent and subsequently with water. As an alternative procedure, the fibers impregnated with the aqueous solution of sericeous material can be dried at substantially atmospheric or room temperature, then washed with the aqueous solution of acidic agent and subsequently with water.

As mentioned above, an aqueous alcoholic solvent is used as the liquid medium in which are dissolved the alkylolamine-copper complex and the alkali metal hydroxide and also as the liquid with which the treated silk fibers are washed. By the term of aqueous alcoholic solvent I mean a mixture of water and alcohol in which the latter is present in the greater proportion by volume. The alcohols which I prefer are saturated acyclic compounds, such as ethyl, isopropyl or tertiary butyl alcohol, and possess boiling points at atmospheric pressure which do not exceed about 120° C. The alcohols suitable for my purpose can be primary, secondary or tertiary compounds and should dissolve sufficient water or be sufficiently soluble in water so that an aqueous alcoholic solvent containing at least about 60 per cent by volume of the alcohol can be prepared. It should be understood that this proportion represents the lower limit of alcohol in the solvent and that solvents possessing a greater proportion, say 70, 80 or 95 per cent can be used. Moreover, the aqueous alcoholic solvent may contain a mixture of two or more alcohols, as for example a solvent consisting of 45 volumes of substantially anhydrous ethyl alcohol, 45 volumes of substantially anhydrous isopropyl alcohol, and 10 volumes of water.

The alkylolamines employed by me for making the copper complexes are illustrated by monoethanolamine (or ethanolamine), diethanolamine and triethanolamine. Such substances are either monohydroxy or polyhydroxy compounds. Also, the alkylolamine may be either a primary, secondary or tertiary amine. Examples of the alkali metal hydroxides suitable for my purpose are sodium hydroxide and potassium hydroxide. I prefer that only a small proportion, say 0.5 to 4 per cent the weight of solution, of the alkali metal hydroxide be present in the aqueous alcoholic solution which contains dissolved alkylolamine-copper complex and which is used for treating silk fibers.

In my process, textile fibers after they have been impregnated with the aqueous extract (containing alkylolamine-copper complex, sericeous material, and possibly a very small proportion of alkali metal hydroxide) are washed with an aqueous solution of an acidic agent. Or, prior to this washing step, the impregnated fibers may be dried at substantially atmospheric or room temperature. In either case, the acidic agent should be one that forms water-soluble salts with the alkylolamine-copper complex and with the alkali metal hydroxide, if the latter is present in solution. Examples of suitable acidic agents are mineral acids, such as hydrochloric or sulfuric acid, and carboxylic acids, such as acetic or lactic acid. Acidic salts, such as sodium or potassium bisulfate, are also applicable as acidic agents.

The aqueous solution of acidic agent can be of any necessary or convenient concentration, say 5 or 10 per cent. The concentration should not be sufficiently great so that the aqueous solution will exert any harmful effect on the fibers while they are being washed therewith. Neither should the concentration be so small that during the washing step the aqueous solution will become locally neutral or even alkaline.

I have observed that dissolution of a water-soluble alkali metal salt, such as sodium or potassium sulfate, or of a water-soluble alkaline-earth metal salt, such as barium chloride or magnesium sulfate, in the aqueous solution of acidic agent oftentimes aids during the washing step in coagulating and/or flocculating the sericeous material held by the impregnated fibers. Some care must be exercised in selection of the salt, as one which reacts with the acidic agent to furnish an insoluble product is undesirable. For example, barium chloride is not a suitable salt with an aqueous solution of sulfuric acid. However, barium chloride may be used with an aqueous solution of either hydrochloric acid or acetic acid. The proportion of salt dissolved in the aqueous solution of acidic agent may be varied within wide limits, as for example, 5, 10 or 15 per cent. For the purposes of this invention, I include ammonium salts with the alkali metal salts.

After they have been washed with the aqueous acidic agent, the fibers should be washed sufficiently well with water so that elimination of substantially all salts and acidic agent therefrom is effected.

What I claim is:

1. The process which comprises treating silk fibers with an alkylolamine-copper complex and an alkali metal hydroxide dissolved in an aqueous alcoholic solvent, the proportion of said alkali metal hydroxide being not more than about 4 per cent and not less than about 0.5 per cent the weight of said solution, and the aqueous alcoholic solvent consisting substantially of only water and a saturated acyclic alcohol of at least two carbon atoms whose boiling point is not greater than about 120° C. and containing at least about 60 per cent by volume of said alcohol, separating the aqueous alcoholic solution from said fibers, washing the treated fibers with the aqueous alcoholic solvent, and extracting said treated and washed fibers with water.

2. The process according to claim 1 in which the alkali metal hydroxide is sodium hydroxide.

3. The process according to claim 1 in which the alkali metal hydroxide is potassium hydroxide.

4. The process which comprises treating silk fibers with a monohydroxy alkylolamine-copper complex and an alkali metal hydroxide dissolved in an aqueous alcoholic solvent, the proportion of said alkali metal hydroxide being not more than about 4 per cent and not less than about 0.5 per cent the weight of said solution, and the aqueous alcoholic solvent consisting substantially of only water and a saturated acyclic alcohol of at least two carbon atoms whose boiling point is not greater than about 120° C. and containing at least about 60 per cent by volume of said alcohol, separating the aqueous alcoholic solution from said fibers, washing the treated fibers with the aqueous alcoholic solvent, and extracting said treated and washed fibers with water.

5. The process according to claim 4 in which the monohydroxy alkylolamine is ethanolamine.

6. The process according to claim 4 in which the monohydroxy alkylolamine is isopropanolamine.

7. The process which comprises treating silk fibers with a polyhydroxy alkylolamine-copper complex and an alkali metal hydroxide dissolved in an aqueous alcoholic solvent, the proportion of said alkali metal hydroxide being not more than about 4 per cent and not less than about 0.5 per cent the weight of said solution, and the aqueous alcoholic solvent consisting substantially of only water and a saturated acylic alcohol of at least two carbon atoms whose boiling point is not greater than about 120° C. and containing at least about 60 per cent by volume of said alcohol, separating said aqueous alcoholic solution from said fibers, washing the treated fibers with the aqueous alcoholic solvent, and extracting said treated and washed fibers with water.

8. The process according to claim 7 in which the polyhydroxy alkylolamine is diethanolamine.

9. The process according to claim 7 in which the polyhydroxy alkylolamine is triethanolamine.

10. The process which comprises treating silk fibers with an alkylolamine-copper complex and an alkali metal hydroxide dissolved in an aqueous alcoholic solvent, the proportion of said alkali metal hydroxide being not more than about 4 per cent and not less than about 0.5 per cent the weight of said solution, and the aqueous alcoholic solvent consisting substantially of only water and a saturated acyclic alcohol of at least two carbon atoms whose boiling point is not greater than about 120° C. and containing at least about 60 per cent by volume of said alcohol, separating the aqueous alcoholic solution from said fibers, washing the treated fibers with the aqueous alcoholic solvent, extracting said treated and washed fibers with water to form a water extract containing an alkylolamine-copper complex and an alkali metal hydroxide and dissolved silk, the proportion of said alkali metal hydroxide being less than about 0.5 per cent the weight of said solution, impregnating textile fibers with said water extract, washing said impregnated fibers with an aqueous solution containing an acidic agent forming water-soluble salts with said alkylolamine-copper complex and with said alkali metal hydroxide, and afterwards washing said textile fibers with water.

11. The method as in claim 10 in which the textile fibers are wool fibers.

12. The method as in claim 10 in which the textile fibers are silk fibers.

13. The method as in claim 10 in which the alkylolamine-copper complex is a monohydroxyalkylolamine-copper complex.

14. The method as in claim 10 in which the alkylolamine-copper complex is a polyhydroxyalkylolamine-copper complex.

References Cited in the file of this patent

UNITED STATES PATENTS

| | | |
|---|---|---|
| 1,921,363 | Lefranc | Aug. 8, 1933 |
| 1,955,221 | Borner et al. | Apr. 16, 1934 |
| 1,990,588 | Fink et al. | Feb. 12, 1935 |
| 2,010,918 | Fink et al. | Aug. 13, 1935 |
| 2,417,388 | Whitner | Mar. 11, 1947 |
| 2,417,389 | Whitner | Mar. 11, 1947 |